Aug. 9, 1960
P. EISLER
2,948,051
METHOD OF MANUFACTURING AN ELECTRICALLY CONDUCTIVE WINDING PATTERN
Filed Sept. 20, 1952
2 Sheets-Sheet 1
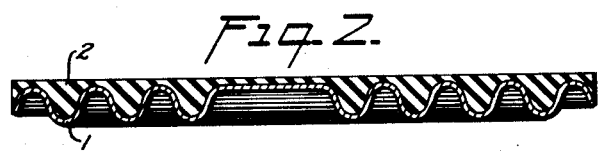
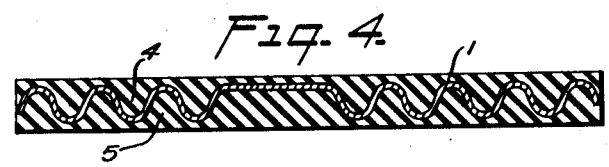
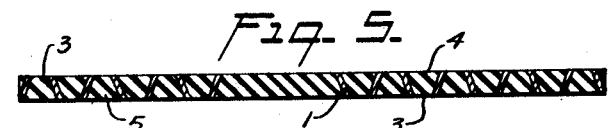
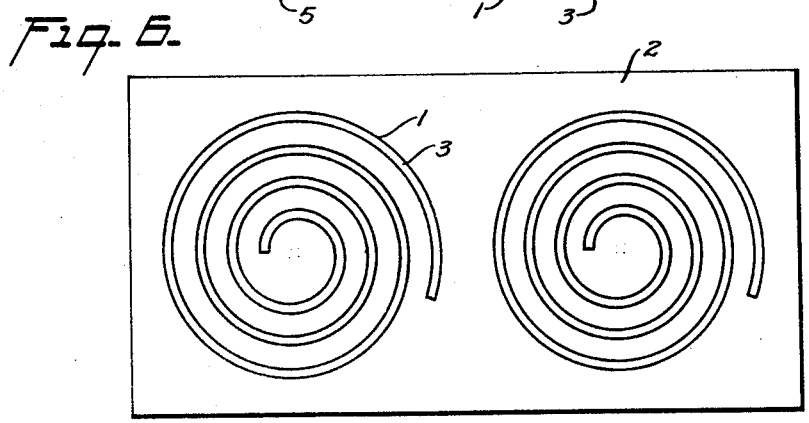
INVENTOR.
PAUL EISLER
BY
ATTORNEY.

INVENTOR.
PAUL EISLER

BY

ATTORNEY.

United States Patent Office 2,948,051
Patented Aug. 9, 1960

2,948,051

METHOD OF MANUFACTURING AN ELECTRICALLY CONDUCTIVE WINDING PATTERN

Paul Eisler, 32 Shaftebury Ave., London, England

Filed Sept. 20, 1952, Ser. No. 310,693

8 Claims. (Cl. 29—155.5)

This invention relates to a method of manufacturing electrically conductive pathways and to articles produced by carrying out the method according to the invention.

The present application is a continuation in part of my co-pending application Serial No. 29,377, filed on May 26, 1948, now Patent 2,703,854, which in turn is a division of application Serial No. 520,991, filed February 3, 1944, now Patent 2,441,960, issued May 25, 1949.

The pathways with which the present invention is concerned are electric windings or coils, such as inductances and windings for transformers or dynamo-electric machines.

The conventional methods of manufacturing pathway patterns of the general type, above referred to, by bending, winding and soldering of wires involves tedious and time consuming operations, particularly when thin wires are used or the desired final coil pattern is an incoherent one.

Accordingly, one of the objects of the invention is to provide a method by which a practically unlimited variety of coil patterns can be rapidly and inexpensively produced.

Another object of the invention is to provide a method of producing a coil pattern as a component of a structural unit having sufficient physical strength to permit a convenient handling independently of the fragility of the coil pattern proper.

The invention also encompasses products which are produced in accordance with the method of the invention.

According to an object of the invention products are provided in which the electrically conductive components of the product, whether electrically coherent or incoherent, are flush or substantially flush with at least one of the surfaces of the product for direct contact connection of different portions of the conductive components either with each other or with other electric components such as capacitors, resistors, etc.

According to another object of the invention the electrically conductive components are entirely encased in hardened insulation material and provided with connecting tags, pigtails, etc. for further connection.

Other and further objects, features and advantages of the invention will be pointed out hereinafter and set forth in the appended claims forming part of the application.

It the accompanying drawing several now preferred embodiments of the invention are shown by way of illustration and not by way of limitation:

In the drawing:

Fig. 1 is a sectional view of a sheet of metal as used for forming a coil pattern according to the invention.

Fig. 2 is a sectional view showing an intermediate operational step in the production of a coil pattern according to the invention.

Fig. 3 is a sectional view of a completed product according to the invention.

Fig. 4 is a sectional view of an intermediate operational step in the production of a modification of a coil pattern according to the invention.

Fig. 5 is a sectional view of a completed coil product according to Fig. 4.

Fig. 6 is a plan view of Fig. 5.

Figure 7:
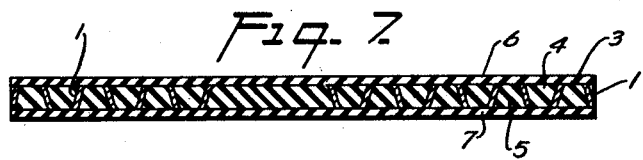
Fig. 7 is a sectional view of the product according to Fig. 5 sandwiched between two layers of insulation material.

Referring first to Figs. 1, 2 and 3 in detail, the first step of producing a product according to Fig. 3 involves deforming a sheet of metal 1 so that those portions of the sheet which do not constitute part of the desired final coil are forced into one of the boundary planes of the sheet. (This plane is in Figs. 1, 2 and 3 the lower boundary plane of the sheet.) Any suitable metal such as copper or a copper alloy may be used. The thickness of the sheet is selected in accordance with the specific requirements of the intended application. It should be so that the sheet is capable of retaining its shape when deformed. The deformation of the sheet can be carried out by any suitable means for instance, a corrugation may be applied to the sheet be means of a press tool. As will be evident, a practically unlimited variety of deformations can be produced thereby allowing for an equally unlimited variety of coil patterns.

The next step which in certain instances may be carried out simultaneously with the first one is to fill the depressions on one side of the blank of Fig. 1 with a hardening insulation material 2. This insulation material fills the depressions or hollows of the sheet blank slightly above the crests or apices of the respective corrugations as is shown in Fig. 2. Various hardening insulation materials are suitable for the purpose. The material should be of a type capable of adhering to the metal of the blank. A synthetic resin has been found to be highly suitable.

Finally, the structure or unit of Fig. 2 forming a preliminary pattern is cut down at its lower boundary plane to the level shown on Fig. 3, for example by planing or grinding. The result is a solid structural unit in which the now electrically separated portions of the original coherent sheet 1 form the conductors of the desired final coil pattern. This pathway pattern may take the form of connected or disconnected spiral windings as shown in Fig. 6. These windings may be used as primary and secondary of a transformer or for many other purposes. As will be noted, the pattern forming portions of the sheet blank are disposed at a steep angle to the planes of the sheet thereby re-enforcing the latter. It will further be noted that the aforementioned cutting down operation produces elongated slots 3 along the apices or crests of the corrugations and that the edges of the sheet portions defining these slots are flush with the respective general plane of the unit. This has the advantage that connections with circuit components, such as capacitors, can be made directly with the said edges.

In some instances, it is necessary or advantageous to form the desired final coil pattern by cutting away the apices or crests of the corrugations formed in both boundary planes of the sheet blank. Then, hardening insulation material 4 and 5, such as synthetic resin, is applied to both sides of the sheet blank slightly above the crest levels of the blank.

Fig. 4 shows a structural unit of this type. The unit is completed by cutting it down on both sides to form the aforementioned slots 3 electrically separating the coil forming portions of the sheet blank now completely embedded in insulation material.

Certain applications for the pattern unit make it desirable to have the pattern supported by and located between insulation on both sides.

Fig. 7 shows an arrangement in which a pattern unit according to Fig. 5 is sandwiched between two layers 6 and 7 of insulation material. These layers may consist of any suitable material. It has been found advantageous to employ insulating sheets built up of superposed paper laminae impregnated with a synthetic resin in uncured condition. A sandwich is now made by interposing the pattern unit of Fig. 5 (or also of Fig. 3) between the two packs of paper laminae all in correct register. The package is then put under pressure and cured. As a result, the paper laminae constituting each sheet 6 and 7 respectively will be bonded together and also to the pattern unit proper. In some cases a mechanical interlocking between sheets 6 and 7 and the pattern unit is desirable. A method and means for this purpose will be more fully explained hereinafter.

Figure 8:
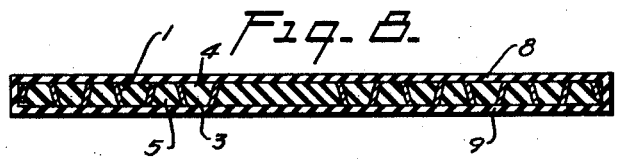
Fig. 8 is a sectional view of a product according to Fig. 5 encompassed by an envelope of insulation material.

Fig. 8 shows an arrangement in which a pattern unit according to Fig. 5 (or also according to Fig. 3) is interposed between two insulation layers 8 and 9 made for instance of paper laminae and extending beyond the edges of the pattern unit. The protruding marginal portions of the insulation sheets are bent down to form an envelope completely encompassing the pattern unit. In this case actual adhesion between the insulation layers and the pattern unit is unnecessary but need not be avoided.

Figure 9:
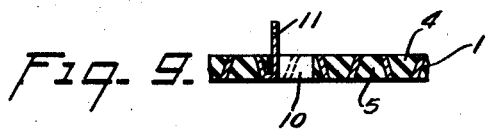
Fig. 9 is a fragmentary sectional view showing connection means for connecting the pattern forming sheet of metal of any of the preceding figures with circuit components.

As previously explained, electric connections can be made directly at the edges formed by cutting away the apices of the sheet. However, in some cases it will be preferable to provide connection tags. Fig. 9 shows a unit of the type according to Fig. 5 which is perforated at 10 and in which part of the sheet is bent up to form a tag 11 protruding from the unit. It is of course also possible to remove part of the insulation material until the sheet proper is exposed and then to bend up part of the same for forming a tag.

The apertures 10 may be used for mechanical mounting of the pattern unit.

Figure 10:
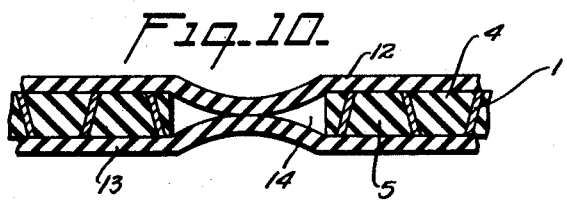
Fig. 10 is a fragmentary sectional view showing means for securing the two insulation layers of Fig. 7 to each other and to the pathway unit proper.
Figure 11:
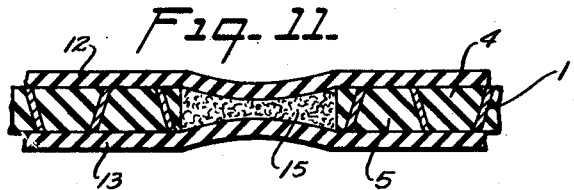
Fig. 11 is a fragmentary sectional view of a modification of Fig. 10.

Fig. 10 shows a unit of the type according to Fig. 5 sandwiched between the two insulation layers 12 and 13. These layers may be of solid material or they may be laminated. In the latter case, they may be composed of a plurality of layers of paper as has been described in connection with Figs. 7 and 8. It is advantageous to provide an inner pack of layers impregnated with polystyrene and an outer pack impregnated with phenol-formaldehyde resin. Then, the inner pack affords high insulation and the outer pack high strength. The same type of insulation layers can of course also be employed for the units according to Figs. 7 and 8.

For the purposes of securing layers 12 and 13 to each other and to the unit proper, the latter is formed with one or more perforations 14. Layers 12 and 13 are depressed or bent into the perforations by any suitable means so that they adhere to each other and to the unit proper when the layers are cured.

In case the unit proper is too thick for a convenient bending of layers 12 and 13, the perforations 14 may be filled with a powderized plastic 15 which is cured or baked together with layers 12 and 13.

Figure 12:
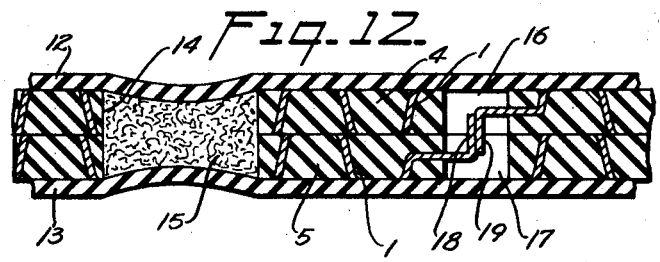
Fig. 12 is a fragmentary sectional view showing several coil pattern units sandwiched between two layers of insulation material and electrically connected with each other.

Fig. 12 shows an arrangement in which two patterns of the type shown in Fig. 5 are superposed and sandwiched between layers 12 and 13. The entire package thus formed is again held together by bending the layers 12 and 13 into aligned perforations 14 filled with plastic powder 15 if desirable.

For the purpose of interconnecting the pathway patterns formed in the two layers one or more transverse holes 16 and 17 are provided in alignment. Respective portions of the patterns extending into aligned holes 16 and 17 are bent off to form tags 18 and 19 which are secured to each other by any suitable means such as soldering.

It will be apparent that the arrangements of Figs. 9 to 12 described in connection with the unit of Fig. 5 can also be applied to a unit according to Fig. 3.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A method of manufacturing an electrically conductive winding pattern from a sheet of metal, comprising the steps of first deforming said sheet vertically to its plane so that the portions of the sheet other than those forming part of the desired winding pattern are substantially situated in the two boundary planes of the deformed sheet, the portions of the sheet forming part of the desired winding pattern being situated in planes intermediate to said boundary planes, filling the depressions formed on both sides of the sheet by the deformation thereof with a hardening insulation material above the apex levels of said boundary planes, and finally removing the insulation material above said apex levels together with the sheet portions substantially situated in said two boundary planes thereof, thereby obtaining the desired winding pattern embedded in said insulation material.

2. A method of manufacturing several electrically conductive windings juxtaposed in a common plane comprising the steps of first deforming a sheet of metal vertical to its plane so that the portions of the sheet other than those forming parts of the desired several windings are substantially situated in the two boundary planes of the deformed sheet and the portions of the sheet forming parts of the desired several windings are situated in planes intermediate to said boundary planes and further so that sheet parts joining the several windings are also situated in one of said boundary planes, filling the depressions formed on both sides of the sheet by the deformation thereof with a hardening insulation material above the apex levels of said boundary planes, and finally removing the insulation material above said apex levels together with the sheet portions substantially situated in said two boundary planes thereby obtaining the desired several windings embedded in said insulation material and electrically separated from each other.

3. A method according to claim 1, wherein the said sheet is deformed by subjecting the same to a corrugating operation placing the portions of the sheet forming part of the desired winding pattern at a steep angle to the general plane of the sheet, the apices of the corrugations thus formed being situated in the said boundary planes, and wherein the said apex portions of the sheet are removed for the purpose aforesaid.

4. A method according to claim 1, in combination with the additional step of covering both sides of said sheet with a layer of insulation material and subjecting the said layers to a treatment effecting adherence of the layers to said sheet and to said insulation material filled in the depressions of said sheet.

5. A method in accordance with claim 1, in combination with the additional step of forming an envelope of insulation material encompassing the entire sheet and the insulation material filled in the depressions thereof.

6. A method in accordance with claim 1, in combination with the additional steps of covering both sides of said sheet with a layer of insulation material, perforating the sheet and the insulation material filled in the depressions thereof, and pressing the said layers into the said perforations so that portions of the layers aligned with said perforations come in contact with each other, and subjecting the layers to a treatment effecting binding of the same with each other and with said sheet and the insulation material filled in the depressions thereof.

7. A method in accordance with claim 6, in combination with the additional step of filling the said perforations with insulation material in powderized form prior to subjecting the said insulation layers to said pressing operation.

8. A method of manufacturing an electrically conductive coil pattern from a sheet of metal, comprising the steps of first corrugating said sheet to form a continuous spiral shaped corrugation, the apices of which spiral are vertically displaced relative to the median plane of the sheet whereby the portions of the sheet forming part of the desired coil pattern are situated in planes intermediate to the planes of said apices, filling the depressions formed on both sides of the sheet with a hardening insulation material above the levels of said apices, and finally removing the insulation material above said apices levels together with the sheet portions substantially situated in the planes of the apices thereby obtaining a continuous spiral coil embedded in said insulation material, but having its edges flush with the insulation material on both sides of the sheet.

References Cited in the file of this patent

UNITED STATES PATENTS

| | | |
|---|---|---|
| 1,718,993 | Wermine | July 2, 1929 |
| 1,794,831 | Caruso | Mar. 3, 1931 |
| 2,297,488 | Luderitz | Sept. 29, 1942 |
| 2,370,846 | Deakin | Mar. 6, 1945 |
| 2,427,144 | Jansen | Sept. 9, 1947 |
| 2,431,393 | Franklin | Nov. 25, 1947 |
| 2,451,725 | Franklin | Oct. 19, 1948 |
| 2,478,633 | Lord | Aug. 9, 1949 |
| 2,502,291 | Taylor | Mar. 28, 1950 |
| 2,511,897 | Booth | June 20, 1950 |
| 2,599,710 | Hathaway | June 10, 1952 |
| 2,638,660 | Van Gessel | May 19, 1953 |

FOREIGN PATENTS

| | | |
|---|---|---|
| 644,565 | Great Britain | Oct. 11, 1950 |